(12) United States Patent
Rabinkin et al.

(10) Patent No.: US 6,609,650 B2
(45) Date of Patent: Aug. 26, 2003

(54) PROCESS FOR MANUFACTURING OF BRAZED MULTI-CHANNELED STRUCTURES

(75) Inventors: Anatol Rabinkin, Morris Plains, NJ (US); Nicholas DeCristofaro, Chatham, NJ (US)

(73) Assignee: AlliedSignal Inc., Morris Township, NJ (US)

(*) Notice: Subject to any disclaimer, the term of this patent is extended or adjusted under 35 U.S.C. 154(b) by 0 days.

(21) Appl. No.: 10/259,144

(22) Filed: Sep. 27, 2002

(65) Prior Publication Data

US 2003/0077474 A1 Apr. 24, 2003

Related U.S. Application Data

(62) Division of application No. 09/427,379, filed on Oct. 25, 1999, now Pat. No. 6,544,662.

(51) Int. Cl.⁷ .......................... B32B 3/12; B23K 20/02
(52) U.S. Cl. .................. 228/178; 228/182; 228/183; 228/190; 228/249
(58) Field of Search .............................. 228/178, 182, 228/183, 190, 249

(56) References Cited

U.S. PATENT DOCUMENTS

| | | | | |
|---|---|---|---|---|
| 4,148,973 A | | 4/1979 | Sexton et al. ............... 428/680 |
| 4,480,016 A | * | 10/1984 | Henschel ..................... 428/678 |
| 4,515,305 A | * | 5/1985 | Hagemeister ............ 228/173.2 |
| 4,745,037 A | * | 5/1988 | DeCristofaro et al. ...... 428/678 |
| 4,801,072 A | * | 1/1989 | Henschel ..................... 228/245 |
| 5,553,770 A | * | 9/1996 | Jha et al. .................... 228/190 |
| 6,200,690 B1 | * | 3/2001 | Rabinkin .................... 428/606 |

OTHER PUBLICATIONS

A. Rabinkin, et al. "Effect of Load on Brazing with MET-GLAS MBF–2005 Filler Metal", Welding Journal, vol. 67, N5, (1988), pp. 33–45.

* cited by examiner

Primary Examiner—John J. Zimmerman
Assistant Examiner—Jason Savage

(57) ABSTRACT

A process is disclosed for brazing plate/plate and plate/fin multi-channeled structures using an amorphous brazing foil as a brazing filler metal between the parts in order to form uniform joints having optimal dimensions, shape and strength. The parts are assembled in an unconstrained stack, and a controlled load is applied to the top of the stack. The stack is then heated to a temperature at which the interlayer melts and reacts with the base metal to form the joints. The stack is cooled resulting in a brazed structure having the desired characteristics, wherein the brazed joints are optimally formed and the strength of the structure is equal to the underlying strength of the base metal.

8 Claims, 6 Drawing Sheets

Circular Joint

Elongated Joint

Joint Top View

Section A-A

Elongated Joint

Circular Joint

Joint Top View

Section A-A (a) (b)

(a)

(b)

PROCESS FOR MANUFACTURING OF BRAZED MULTI-CHANNELED STRUCTURES

This application is a divisional of application Ser. No. 09/427,379 filed Oct. 25, 1999 now U.S. Pat. No. 6,544,662.

BACKGROUND OF THE INVENTION

This invention relates to a manufacturing method of brazing uniform plate/plate and plate/fin multi-channeled structures using an amorphous brazing foil as a brazing filler metal.

FIELD OF THE INVENTION

Description of the Prior Art

Brazing is a process for joining metal parts, often of dissimilar composition, to each other. Typically, a brazing filler metal that has a melting point lower than that of the parts to be joined is interposed between the parts to form an assembly. The assembly is then heated to a temperature sufficient to melt the brazing filler metal. Upon cooling, a strong and preferably corrosion resistant joint is formed.

One class of products produced by brazing processes is three-dimensional structures comprised of a number of alternating metal flat plates and fins or corrugated plates kept in tight, physical and sealed contact. This contact occurs through joints formed across multiple local areas positioned between flat plates and fins, as in the case of plate/fin heat exchangers or between corrugations stamped out in special patterns in the plate/plate case. The corrugation profiles may have a chevron pattern or pressed-out indentations of various circular forms or some other profiles. In the brazed state these indentations are joined with flat plates or with each other forming an elaborate system of channels or interlocking cavities. Eventually, in service, one hot and one cool liquid and/or gas media flow separately in these channels exchanging heat and thus saving energy. In most cases these structures are made from heat and corrosion resistant steels and alloys as base metals and operate at high temperatures as coolers in utility hot water systems and as heat exchangers and recuperators in aerospace, chemical, food and other process industries.

The most effective physical contact of the initial gaps existing between some area of the plate cross-section is made with brazing carried out using a preplaced filler metal preform between base metal parts. This preform may be in a powder or a foil form.

The majority of Ni- and Co-based advanced filler metals that can be used for joining these structures contain a substantial amount of metalloid elements such as boron, silicon and/or phosphorus. Consequently, such alloys are very brittle in conventional crystalline form and available only as powders, powder-binder pastes and tapes and bulky cast preforms. Powders and powder-based preforms do not easily permit brazing of complex forms. However, these Ni- and Co-based alloys can be transformed into a ductile, flexible foil that is produced utilizing rapid solidification technology and which has an amorphous structure in the solid state. Such amorphous alloys for brazing applications are disclosed in many patents, for example U.S. Pat. Nos. 4,148,973 and 4,745,037 (NDC, 1979 1988). In spite of substantial advantages of rapid solidification technology achieved so far, the foil thus produced has cross-sectional and longitudinal thickness variations, sometimes exceeding ±40%.

So far, practically all multi-channeled brazed structures have been produced using filler metal powder sprayed on the base metal parts and/or amorphous brazing foil. The use of powder filler metals requires an excessive amount of material per product cross-section and, most importantly, results in uneven, porous and poor quality joints. The use of foil in constrained assemblies, while being much more effective than powder, necessitates small variations in the foil thickness. This is particularly important when these assembled alternating base metal plates and foil preforms are constrained from mutual movement during brazing. It is rather difficult to satisfy the limits of these variations when using amorphous foil in constrained assemblies to be brazed because the foil has large local thickness variations, up to ±50%, due to specifics of the rapid solidification technology. Further, to optimize the brazed structure performance when choosing the proper average foil thickness relative to the base metal plate thickness and geometry, one needs to carry out tedious preliminary experiments with foils having different thicknesses. Moreover, nonadjustable, constrained assemblies require that all parts have very precise dimensions and a very accurate part placement that is difficult and expensive to satisfy using the existing technology. To illustrate, generally the height of channels, and therefore the height of fins or elevations in corrugated parts, is mostly within 3 to 10 mm, whereas the width and the length of the plates and fins are in the range of hundreds of millimeters. Concurrently, the gaps between parts to be joined should be only about 25 to a maximum of about 75 $\mu$m. Any potential variations in plate dimensions or local defects such as indents, etc., that are larger than ±10 $\mu$m (i.e., only about 0.1 to 0.3% of the plate height) may result in unbrazed and, consequently, defective areas. The only way to seal these local large gaps is to fill them with a filler metal. In contrast, when the gaps are large, but the amount of available filler metal is small or the filler metal has poor flow as powder does, then filling of these excessive gaps may not be sufficient in a mechanically constrained assembly of plates and preforms. As a result, there may be large unbrazed areas.

There is another major objective to be addressed when producing three-dimensional structures: namely, the pressure of the operating media used in the structures or changes thereof during long term service that these structures should withstand. This pressure should be safely contained by the total strength of the structure, which is determined as the product of the total joint cross-section of all contact areas times the joint strength. Whereas the joint strength is a parameter determined mostly by the joint microstructure that, in turn, is affected by the time-temperature brazing conditions, it is rather difficult to predict and, even more, difficult to regulate the joint cross-section in each contact area. The same is true for the thickness of each joint when these structures are manufactured using foils with varied thicknesses and fins and parts with varied dimensions. In the ideal case of a high strength joint, a potential failure of the brazed structure under the critical internal pressure would occur in the structural parts made of the base metal.

Thus, there is a continuing need for an improved method of brazing complex three-dimensional plate/plate and plate/fin structures that can provide strong joints with controlled cross-section dimensions without being overly dependent on: (a) brazing foil thickness and its variations; and (b) the shape and accuracy of dimensions of fins and profiles.

Meanwhile, there exists experimental data showing the positive effect of load applied to specimens having gaps that vary with the load and which are brazed using amorphous foil. This data indicates the importance of load in the improvement of liquid filler metal wetting of rough gap surfaces and formation of non-porous brazes. Moreover, the self-adjusting interplay between the surface tension of a liquid filler metal and the applied load also optimizes the thickness, the microstructure and, most importantly, the strength of brazes. This fundamental load effect provides the scientific basis for the proposed method of the present invention to improve brazed multi-channeled structures.

SUMMARY OF INVENTION

The above-noted problems, and others, are overcome by this invention, in which the present brazing methods are improved by using preplaced amorphous or brazing foil and assembling an unconstrained and properly and uniformly loaded stack of alternating sets of plate/foil preform/plate or plate/foil preform/fin/foil preform/plate.

This improvement is embodied in a brazing method comprising the steps of interposing an interlayer in an amorphous foil form between plates and fins to be joined, assembling parts in an unconstrained stack, applying a controlled load on the top of the stack, heating the assembly under suitable conditions to a temperature at which the interlayer melts and reacts with the base metal parts, and cooling the assembly to produce a structure with even-sized joints having optimal dimensions, shape and high strength.

The invention also comprises a brazed structure produced by the method described hereinabove.

BRIEF DESCRIPTION OF THE DRAWINGS

Details of the invention, and of certain preferred embodiments thereof, will be better understood upon reference to the drawings, wherein.

DETAILED DESCRIPTION OF THE INVENTION

Figure 1:
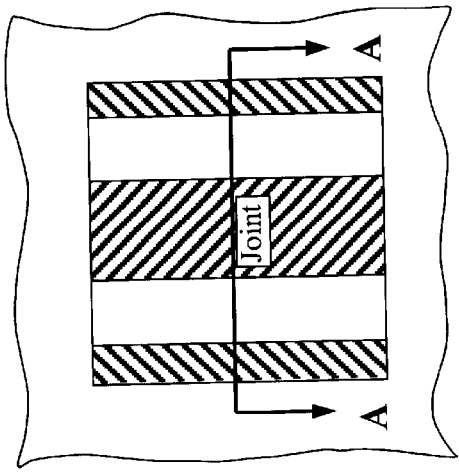
FIG. 1(a) is a top view of a circular joint formed in a brazed heat exchanger.
FIG. 1(b) is a top view of an elongated joint formed in a brazed heat exchanger.
FIG. 1(c) is a cross-sectional view of the circular joint shown in FIG. 1(a) and the elongated joint shown in FIG. 1(b) formed in a brazed heat exchanger.
Figure 1:
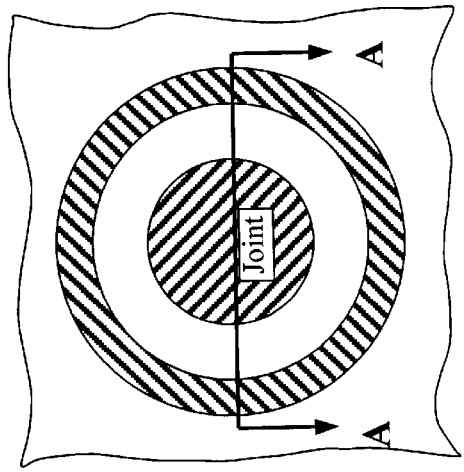
Figure 1:
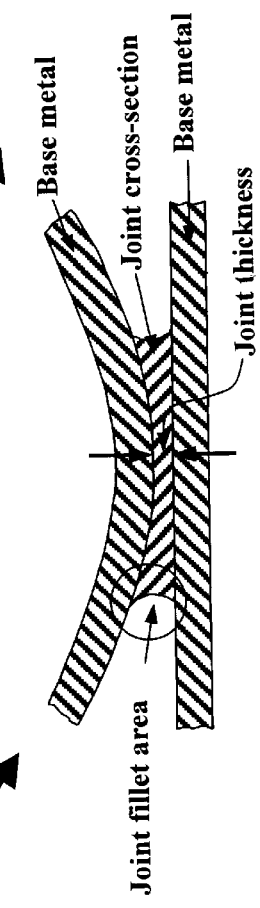
Figure 2:
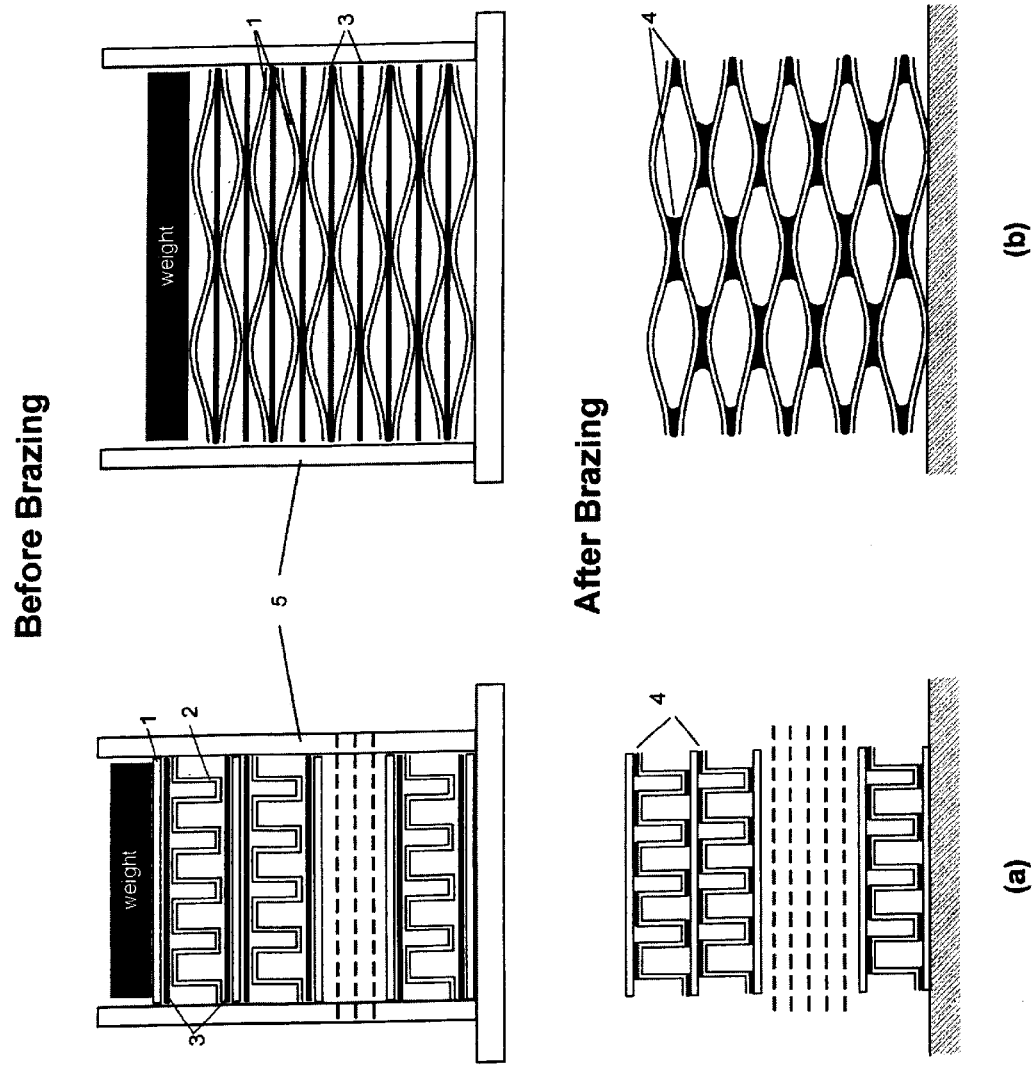
FIG. 2(a) is a schematic view of a plate/fin assembly before and after brazing.
FIG. 2(b) is a schematic view of a plate/plate assembly before and after brazing.

In any manufacturing brazing process of multi-channeled structures, all brazes on each contact surface should be complete, uniform and structurally sufficient to guarantee a non-leaking product that can withstand extended service time under rather high and, sometimes, variable pressure and temperature conditions. In general, the total brazed product mechanical performance is frequently characterized by the maximum burst pressure and the long-term sustainable pressure as standard parameters. Both of these parameters are determined by either the total contact surface of joints and/or the cross-section of base metal structural members under load, as illustrated in FIG. 1, and their intrinsic strength per $cm^2$ depending on the failure location. In accordance with the invention, a method is provided to manufacture a uniform, non-leaking, strong, multi-channeled plate/fin and plate/plate brazed structure in which an amorphous foil that may have large thickness variations can be used as a filler metal. The method consists of the following steps:

(a) a filler metal in foil form with an amorphous structure and with a melting temperature that is less than the melting temperature of any of base metal plate and fin parts is chosen;

(b) plates 1, fins 2 and brazing filler metal preforms 3 are designed in such a way that when assembled in a stack within structure 5 according to the sequences shown in FIG. 2, they can move freely in the vertical direction during the brazing operation;

(c) plates, fins and preforms made of an amorphous filler metal are assembled in the stack preferably in structure 5 that may have a set of guides preventing the parts from sliding laterally;

(d) a compressive load is applied to the assembly by placing a fixed amount of weight on the top of the stack as shown in FIG. 2;

(e) the assembly is placed in a furnace and is heated to at least the melting temperature of the filler metal; and (f) the assembly is cooled.

Under these conditions, the brazing filler metal is melted filling only initial gaps between parts being brazed, as shown in FIG. 2 "After Brazing." Simultaneously and most specifically, the applied load equilibrates the gaps in the middle of all brazes being formed, to about 15 $\mu$m to 30 $\mu$m depending on the load, by moving parts down until this movement stops due to equilibrium setting in between the load and the surface tension forces of the molten metal in initial gaps where capillary forces play a sufficient role. The excessive molten metal is partially expelled out of the brazed gaps forming fillets with large cross-sections and of an advantageous form, thus resulting in high strength joints. The overall dimensions of structures assembled from the same number of parts and preforms are constant regardless of variations in thickness of foils used and plate/fin dimensions because they are now functions of mostly interplay between the surface tension of the molten filler metal and the load. Moreover, all formed channels of the structure attain equal cross-sections.

Foils useful in the process described above typically are on average about 37 to about 60 $\mu$m thick, which is also the desired spacing between parts to be joined. Such spacing maximizes the strength of the brazed joints. Thinner foils may result in insufficient amounts of liquid filler metal to fill all potential excessive gaps. Thicker foils are not economical and may not be needed because the failure of the structure described in the present invention would occur not in the brazed joints but rather in the base metal parts when the thicker foil is used. Accordingly, the ideal goal of a brazed structure is achieved wherein the failure is determined by the strength of the base metal.

EXAMPLE

In order to illustrate the forgoing, samples were supplied that were manufactured in accordance with the following general concepts of the present invention. Flat plates were stamped and sinusoidal shape fins were formed from UNS4360 stainless steel sheets having 100 μm and 50 μm thickness, respectively. An abrasive water jet cutting method was used to cut flat filler metal preforms in a foil form from Ni-based amorphous alloy within American Welding Specification ANSI/A5.8 for BNi-2.

Figure 3:
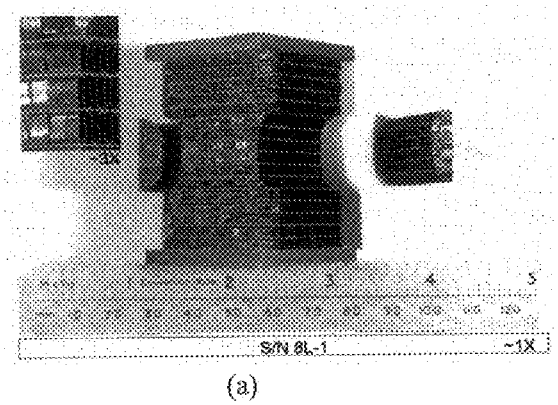
FIG. 3 are photographs of samples used to demonstrate an embodiment of the present invention (a) before and (b) after mechanical testing at 650° C.
Figure 3:
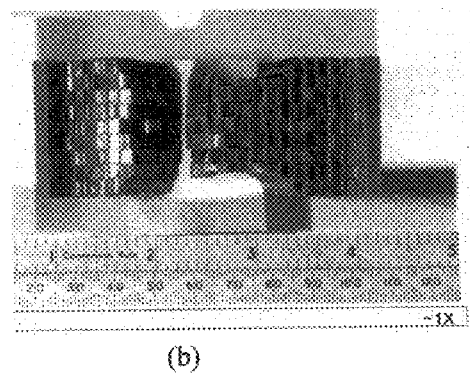

Amorphous foils of 25 μm, 37 μm, and 50 μm average thickness were used but their across-the-web profiles, measured by a profilometer with a thin tipped probe, had local troughs as deep as 15–20 μm. Three samples were assembled as stacks of 16 identical part sets. Each set consisted of the plate/preform/fin/preform/plate parts. Upon brazing, each of the 16 sets became a plurality of sealed channels simulating the channels in actual heat exchangers. Each sample was comprised of identical base metal plate and fin members for all samples but contained foil preforms having one of the above mentioned thicknesses. Each sample was assembled between vertical guides attached to a thick plate of a special holder permitting all stack parts to move freely in the vertical direction during a complete brazing cycle. A load was placed on the top of each sample in the form of a metal or graphite block as shown in FIG. 2. The loaded samples in structure 5 were placed in a vacuum furnace in the vertical position and brazed at a temperature of approximately 1090° C. for 15 min. After brazing, the samples were prepared for mechanical testing. They were cut and then machined by the electrical discharge method into specimens with I-beam shapes having about a 25 mm×25 mm cross-section in the specimen "neck," as depicted in FIG. 3(a). The cutout pieces were used to prepare metallographic samples. The joint dimensions and microstructure, as a function of the preform thickness, were measured using an optical microscope under a moderate 100×magnification.

Figure 4:
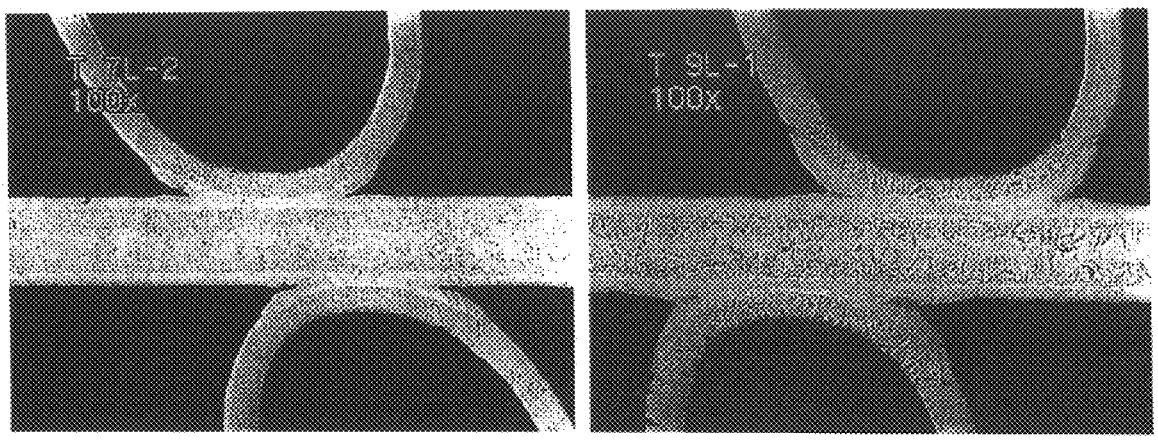
FIG. 4 are photographs of the microstructure of two stainless steel joints brazed using (a) 25 $\mu$m and (b) 50 $\mu$m thick amorphous foils.

Metallographic observations showed that the joint thickness in the middle portion of all brazes is the same regardless of the thickness of the virgin amorphous foil, even when comparing samples manufactured using 25 μm and 50 μm foils as FIGS. 4a and 4b demonstrate. This effect was observed because brazing gaps were not constrained. Indeed, the excess liquid MBF-20 alloy was partially expelled from the capillary gaps upon melting until the surface tension forces at all gap surfaces became equal to the total load applied to the specimen, the total load being the parts weight and the weight of the external block. This excessive molten MBF-20 metal, particularly in the 50 μm foil, flowed out of the initial gaps forming large fillets and partially climbed up on the vertical walls of the fins. The thicker filler metal resulted in larger joint fillets which had advantageous shapes without a narrow cavity-like crystallization shrinkage pattern seen in FIG. 4a and, therefore, larger joint cross-sections as depicted in FIG. 4b. The height of formed individual passages in all brazed specimens was measured using a standard optical comparator with the following results:

| Filler metal thickness, mm (mil*) | Average passage height, mm (mil*) | Total height of 16 passages, mm (mil*) |
|---|---|---|
| 25 μm | 3.282 (129.21) | 52.514 (2067.5) |
| 37 μm | 3.287 (129.4) | 52.590 (2070.5) |
| 50 μm | 3.284 (129.3) | 52.557 (2069.2) |

*Unit in which these parameters were measured.

Because sixteen brazing foils were preplaced in each of the samples, the initial difference between assembled packs with 25 μm and 50 μm thick foils was 0.4 mm. This difference practically disappeared because the total difference in heights of these two samples in the brazed state is only 0.042 mm.

The I-beam shaped brazed samples were tensile tested at 650° C. using a standard tensile testing machine. The samples evidenced the following maximum load at failure, and this load varied linearly with the foil thickness:

| Filler metal thickness, mm (mil*) | Maximum load at sample failure at 650° C., kg (lbf*) |
|---|---|
| 25 μm | 342 (754) |
| 37 μm | 429 (946) |
| 50 μm | 537 (1183) |

Figure 5:
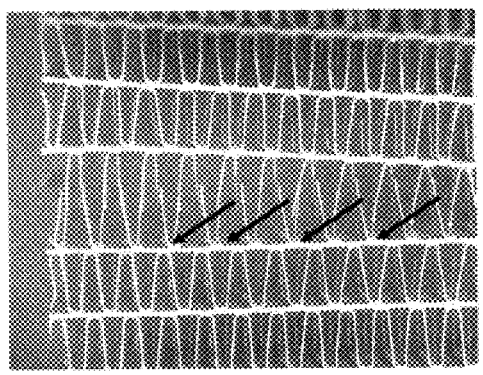
FIG. 5(a) is a photograph showing a side view of a sample after failure under tensile mode mechanical testing at 650° C. showing the failure location in the brazed joint.
FIG. 5(b) is a photograph showing a side view of a sample after failure under tensile mode mechanical testing at 650° C. showing the failure location in the base metal.
Figure 5:
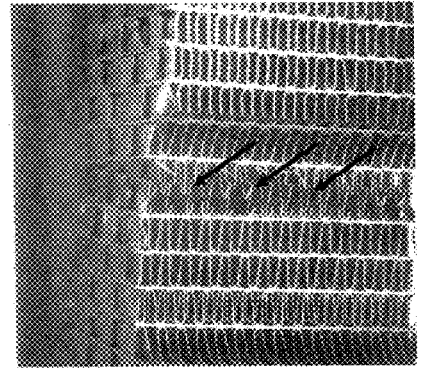
Figure 6:
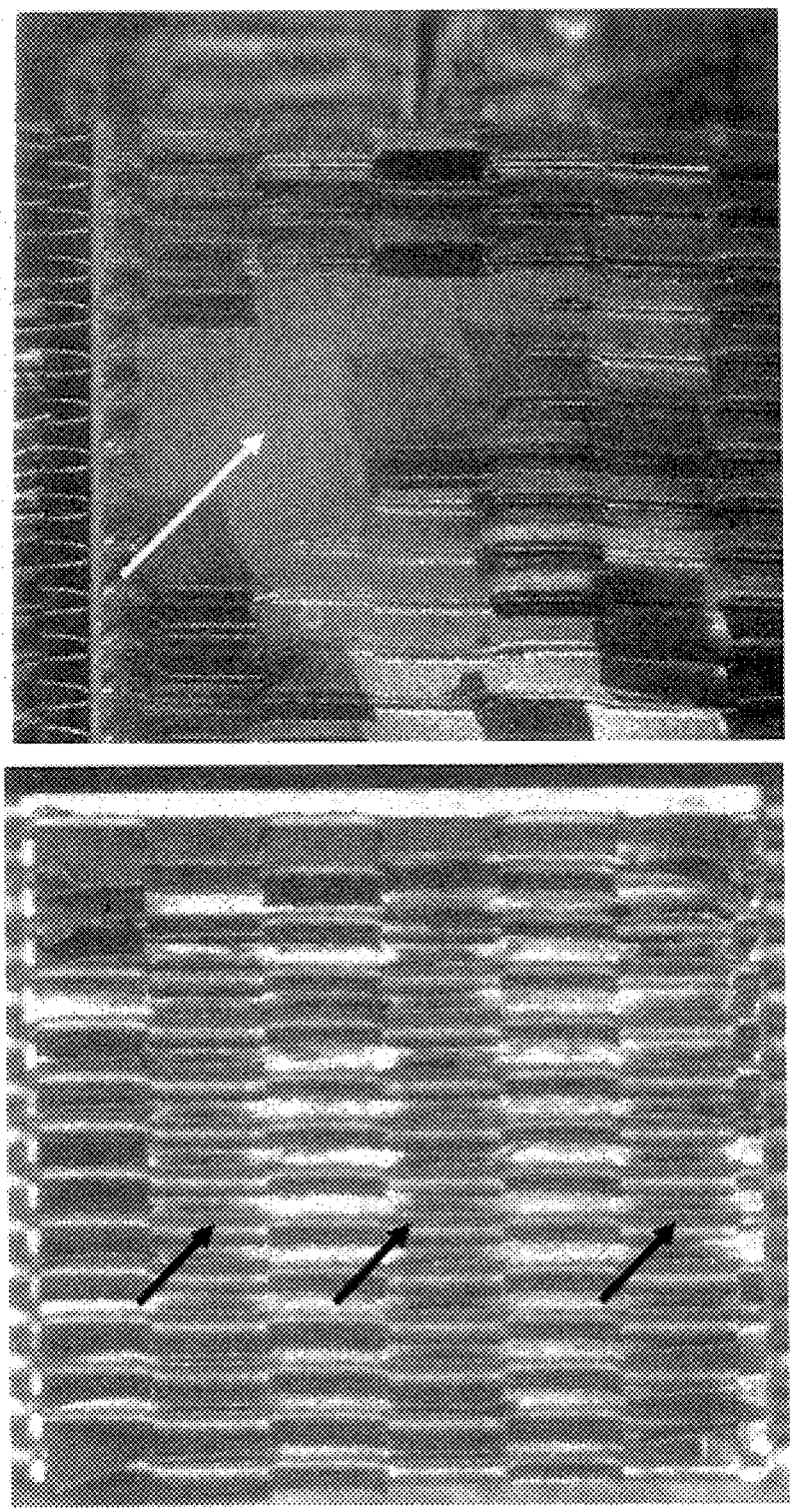
FIG. 6 is a photograph showing a view of two halves of a sample manufactured with a thin (25 $\mu$m) preplaced amorphous brazing filler metal in a foil form showing a large unbrazed area due to presence of a small dent in the fin.

Optical observations of the failed samples under a moderate 20×magnification, as depicted in FIGS. 5a and 5b, showed that in samples brazed using 25 μm and 37 μm average thickness foils, the failure occurred in the brazes, as depicted in FIG. 5a. Also, in some samples brazed using 25 μm foil large unbrazed spots were observed due to insufficient amount of brazed filler metal needed to fill occasional dents or other defects in the fin form, as FIG. 6 demonstrates. Whereas in the case of the 50 μm foil sample, the failure occurred in the middle of the fins, as depicted in FIG. 5b. Therefore, in this case the strength of the brazed structure was determined ideally by the strength of the base metal.

Having thus described the invention in rather full detail it will be understood that such detail need not be strictly adhered to but that various changes and modifications may suggest themselves to one skilled in the art, all falling within the scope of the invention as defined by subjoined claims.

We claim:

1. A method for brazing parts comprising the steps of:
   a) interposing a metallic interlayer in amorphous foil form between the parts to be joined;
   b) assembling the parts in an unconstrained stack;
   c) applying a controlled load on the top of the stack;
   d) heating the stack to a temperature at which the interlayer melts and reacts with the base metal; and
   e) cooling the stack to produce a structure with uniform joints having optimal dimensions, shape and strength.

2. A method according to claim 1, wherein the parts are selected from the group consisting of plates and fins.

3. A method according to claim 2, wherein the plates and fins are each made from metals.

4. A method according to claim 1, wherein the interlayer is comprised of flat preforms made of amorphous metal foil.

5. A method according to claim 4, wherein the amorphous metal foil has an average thickness between about 25 μm to about 60 μm.

6. A method according to claim 4, wherein the amorphous metal foil has an average thickness between about 37 μm to about 50 μm.

7. A method according to claim 1, wherein the value of the load applied does not exceed the value which will cause the stack to collapse at the brazing temperature.

8. A method according to claim 1, wherein the uniform brazed joints are of an optimal thickness and have full-bodied fillets formed to completely seal all brazing gaps without residual pores.

* * * * *